United States Patent
Kito et al.

[11] Patent Number: 5,946,464
[45] Date of Patent: Aug. 31, 1999

[54] GROUPWARE SYSTEM HAVING AGENT FUNCTION

[75] Inventors: Masayoshi Kito, Ebina; Hiroyuki Suzuki, Hiratsuka; Yoshiki Matsuda, Yokohama, all of Japan

[73] Assignee: Hitachi, Ltd., Tokyo, Japan

[21] Appl. No.: 08/867,194

[22] Filed: Jun. 2, 1997

[30] Foreign Application Priority Data

Jun. 5, 1996 [JP] Japan ................................. 8-165352

[51] Int. Cl.⁶ ........................... G06F 13/38; G06F 15/17
[52] U.S. Cl. ............................... 395/200.32; 395/200.34
[58] Field of Search ..................... 395/200.31, 200.32, 395/200.33, 200.34, 200.35, 200.36, 200.37, 200.49, 200.54, 200.3, 200.47, 200.48, 200.53, 200.68, 200.79; 345/326, 331, 335

[56] References Cited

U.S. PATENT DOCUMENTS

| | | | |
|---|---|---|---|
| 5,345,587 | 9/1994 | Fehskens et al. | 395/650 |
| 5,434,994 | 7/1995 | Shaheen et al. . | |
| 5,506,955 | 4/1996 | Chen et al. | 395/183.02 |
| 5,513,126 | 4/1996 | Harkins et al. . | |
| 5,557,796 | 9/1996 | Fehskens et al. | 395/650 |
| 5,603,054 | 2/1997 | Theimer et al. | 395/826 |
| 5,621,892 | 4/1997 | Cook | 395/200.1 |
| 5,721,908 | 2/1998 | LaGarde et al. | 395/610 |
| 5,752,246 | 5/1998 | Rogers et al. | 707/10 |
| 5,790,789 | 8/1998 | Suarez | 395/200.32 |
| 5,802,396 | 9/1998 | Gray | 395/840 |

FOREIGN PATENT DOCUMENTS

| | | |
|---|---|---|
| 0600235 | 6/1994 | European Pat. Off. . |
| 0608470 | 8/1994 | European Pat. Off. . |

OTHER PUBLICATIONS

DBMS Journal, "Patrol Version 3.0.15.", M&T Publishing Inc., Apr. 1996, v9 n4 p.40(4).

LAN Times, Graziano, Claudia; McGraw–Hill Inc. Jul. 3, 1995, "BMC Software scales PATROL", v12 n13 p.53(2).

The Workgroup Computing Report, Seybold Group Dec. 1994, "Electronic Workforce from Edify; group agents to support business tasks", v17 n12 p.18(4).

*Primary Examiner*—Mark H. Rinehart
*Assistant Examiner*—Marc D. Thompson
*Attorney, Agent, or Firm*—Antonelli, Terry, Stout & Kraus, LLP

[57] ABSTRACT

In a groupware system having a server apparatus and a plurality of client apparatuses connected thereto through a network, the server apparatus includes an agent server and each of the client apparatuses includes an agent client. An agent generation unit of the agent server generates an agent on the basis of an agent definition prepared by a user's input in an agent definition unit of an agent client. A trigger monitor unit or a trigger monitor unit of another server monitors and detects a trigger specified in the agent definition; and an action database or a filtering unit of another server extracts the trigger specified in the agent definition. An action request processing unit requests the associated server to do an action associated with the extracted trigger, and sends a processed result of the server to a report processing unit. The report processing unit prepares report information and, in response to user's request, sends it to a report unit. Databases connected to the respective servers store associated agent definition information therein. In order to change a series of operations involved by generation of an event caused by the agent definition, the operations of the individual servers are automatically changed without changing settings to individual systems for every event generation.

18 Claims, 17 Drawing Sheets

FLOWCHART OF TRIGGER MONITOR PROCESS IN AGENT SERVER

FLOWCHART OF TRIGGER MONITOR PROCESS IN INDIVIDUAL FUNCTION SERVERS

FLOWCHART OF REPORT PROCESS

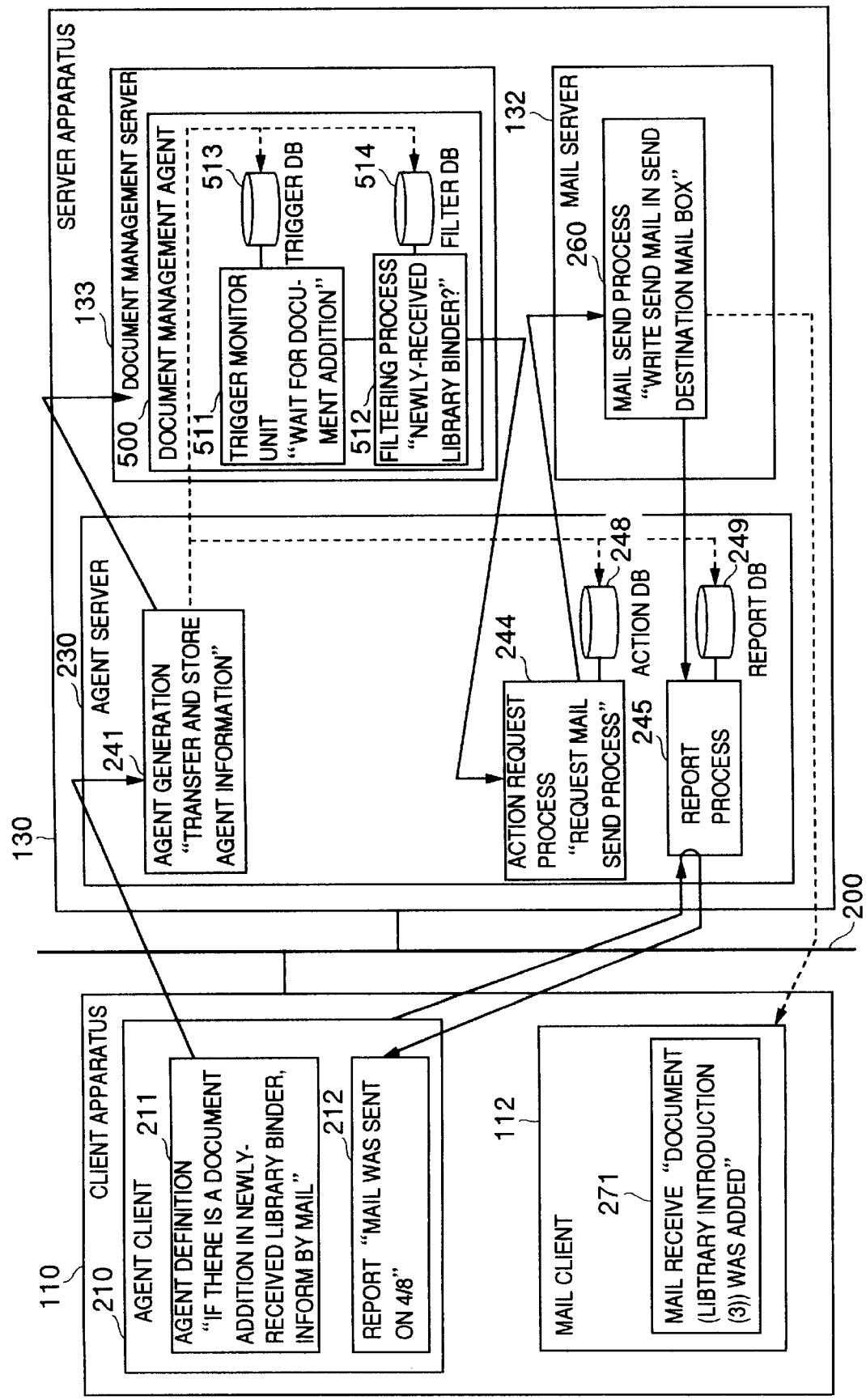

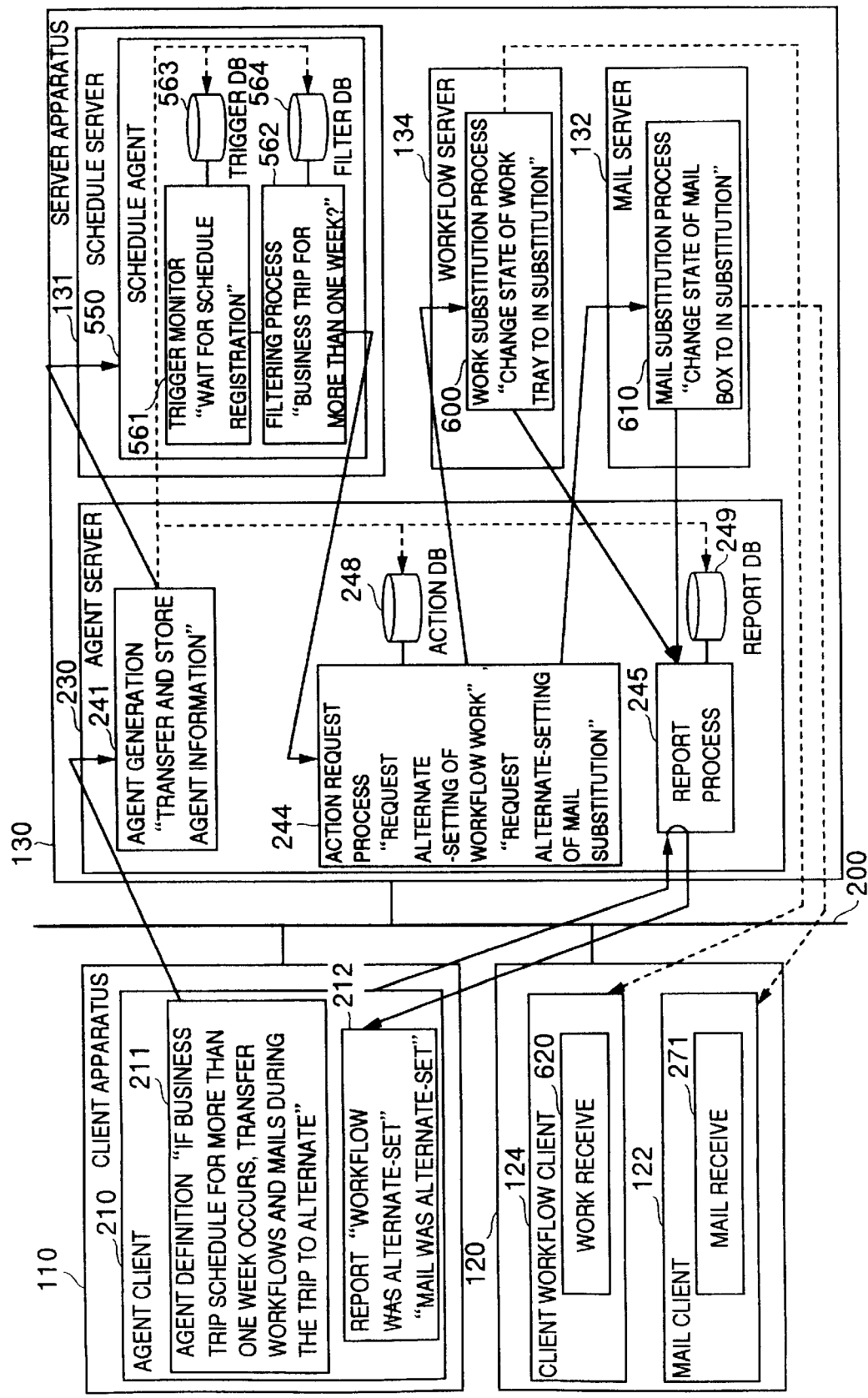

FIG. 15

| ITEMS | TRIGGER | | FILTERING | | ACTION | |
|---|---|---|---|---|---|---|
| COMMON | TIME<br>ELAPSED TIME<br>DATE<br>WEEK DAY | Time<br>Hour<br>Date<br>Day | TIME<br>ELASPSED TIME<br>DATE<br>WEEK DAY | Time<br>Hour<br>Date<br>Day | | |
| SCHEDULER | REGISTER SCHEDULE<br>CHANGE SCHEDULE<br>CANCEL SCHEDULE | AddAppointment<br>ChangeAppointment<br>DeleteAppointment | ITEM<br>DURATION<br>DESTINATION/PLACE | Item<br>Term<br>Place | REGISTER SCHEDULE<br>CHANGE SCHEDULE<br>CANCEL SCHEDULE | AddAppointment<br>ChangeAppointment<br>DeleteAppointment |
| MAIL | RECEIVE MAIL<br>OPEN MAIL<br>SEND MAIL<br>REPLAY MAIL<br>TRANSFER MAIL<br>SET ALTERNATE<br>RESET ALTERNATE | ReceiveMail<br>OpenMail<br>SendMail<br>ReplyMail<br>TransferMail<br>SetAlternate<br>ResetAlternate | SENDER/RECEIVER<br>EMERGENT DEGREE<br>MAIL TITLE | Person<br>Priority<br>Title | RECEIVE MAIL<br>SEND MAIL<br>REPLY MAIL<br>TRANSFER MAIL<br>SET ALTERNATE<br>RESET ALTERNATE SETTING | ReceiveMail<br>SendMail<br>ReplyMail<br>TransferMail<br>SetAlternate<br>ResetAlternate |
| DOCUMENT MANAGEMENT | REGISTER DOCUMENT<br>CHANGE DOCUMENT<br>REFER DOCUMENT<br>DELETE DOCUMENT<br>ADD BINDER<br>CHANGE BINDER<br>DELETE BINDER | AddDoc<br>UpdateDoc<br>ReferDoc<br>DeleteDoc<br>AddBinder<br>UpdateBinder<br>DeleteBinder | BINDER TITLE/DOCUMENT TITLE<br>REGISTER/PREPARER | Title<br>Owner | REGISTER DOCUMENT<br>DELETE DOCUMENT<br>ADD BINDER<br>CHANGE BINDER<br>DELETE BINDER | AddDoc<br>DeleteDoc<br>AddBinder<br>UpdateBinder<br>DeleteBinder |
| WORKFLOW | ADD WORK<br>RECEIVE WORK<br>OPEN WORK<br>HOLD WORK<br>ACCEPT WORK<br>REJECT WORK<br>SET ALTERNATE<br>RESET ALTERNATE SETTING | AddWork<br>ReceiveWork<br>OpenWork<br>HoldWork<br>AcceptWork<br>RejectWork<br>SetAlternate<br>ResetAlternate | DRAFT WRITER/SENDER<br>EMERGENT DEGREE<br>IMPORTANCE<br>WORK TITLE<br>LIMIT | Owner<br>Priority<br>Importance<br>Title<br>Limit | ADD WORK<br>SET ALTERNATE<br>RESET ALTERNATE SETTING<br>BINDER TITLE/DOCUMENT TITLE | AddWork<br>SetAlternate<br>ResetAlternate |

FIG.16

| | | |
|---|---|---|
| 0010 | : id | #"0001"' \n' |
| 0020 | : name | #"automatic deletion agent of opened mails"' \n' |
| 0030 | : user-id | #"Suzuki"' \n' |
| 0040 | : comment | #"Delete opened mails at 23:00 every Friday"' \n' |
| 0050 | : report | #"enable"' \n' |
| 0060 | : trigger-server | #"AgentServer"' \n' |
| 0070 | : trigger-param | #"Time=23:00"' \n' |
| 0080 | : filter-param | #"Day=Friday"' \n' |
| 0090 | : action-server | #"MailServer"' \n' |
| 0100 | : action-param | #"DeleteMail, Mail=Opend"' \n' |

FIG.17

| | | |
|---|---|---|
| 1010 | : id | #"0002"' \n' |
| 1020 | : name | #"newly-received library binder monitor agent"' \n' |
| 1030 | : user-id | #"Suzuki"' \n' |
| 1040 | : comment | #"If there is a document addition in newly-received library binder, inform it by mail"' \n' |
| 1050 | : report | #"enable"' \n' |
| 1060 | : trigger-server | #"DocumentServer"' \n' |
| 1070 | : trigger-param | #"Type=Add"' \n' |
| 1080 | : filter-param | #"Binder=""newly-received library"""' \n' |
| 1090 | : action-server | #"MailServer"' \n' |
| 1100 | : action-param | #"SendMail, Message=&Document||""was added"' \n' |

FIG.18

| | | |
|---|---|---|
| 2010 | : id | #"0003" ' \n ' |
| 2020 | : name | #"mail/workflow alternate setting agent" ' \n ' |
| 2030 | : user-id | #"Suzuki" ' \n ' |
| 2040 | : comment | #"If business trip for more than one week occurs, alternate-set for mail and workflow" ' \n ' |
| 2050 | : report | #"enable" ' \n ' |
| 2060 | : trigger-server | #"ScheduleServer" ' \n ' |
| 2070 | : trigger-param | #"Type=Add" ' \n ' |
| 2080 | : filter-param | #"Item=""business trip""" ' \n ' |
| 2090 | : filter-param | #"Term>=1W" ' \n ' |
| 2100 | : action-server | #"WorkflowServer" ' \n ' |
| 2110 | : action-param | #"SetAlternate" ' \n ' |
| 2120 | : action-server | #"MailServer" ' \n ' |
| 2130 | : action-param | #"SetAlternate" ' \n ' |

GROUPWARE SYSTEM HAVING AGENT FUNCTION

BACKGROUND OF THE INVENTION

The present invention relates to groupware systems and more particularly, to a groupware system in which an agent unit allows cooperative operation of schedule, mail, document management and work flow functions.

There exists a groupware system which organically cooperatively combines a schedule function (system) of registering a schedule in the form of electronic data and managing a schedule, a mail function of sending/receiving and editing electronic mails, a function of work flow corresponding to a definition of routine tasks in accordance with a predetermined flow of jobs, and a document management function of electronically managing documents and allowing registration, retrieval and reference thereof, as disclosed in "Integrated Groupware Package", a journal "HITACHI Hyoron", Vol. 77, No. 5(1995–5), P31. There also exists such a groupware system that these functions are activated at the same time so that a plurality of user can use these functions through a client unit.

In a general groupware system, a server apparatus and a plurality of client apparatuses are connected through a network.

The server apparatus includes a schedule server for implementing individual functions in the groupware system, a mail server, a document management server, and a workflow server. Connected to the respective servers in the server apparatus are databases (DBs) for storing information necessary for the respective functions respectively. More specifically, the schedule server is connected with a schedule management database for storing schedule information therein. Similarly, the mail server is connected with a mail management database, the document management server is with a document management database, and the workflow server is with a workflow management database.

Each of the client units includes a schedule client, a mail client, a document management client and a workflow client.

The server apparatus, for example, in response to a request from the schedule client of the client apparatus through a network, realizes the schedule function based on the schedule server and the schedule management database. The mail function, document management function and workflow function are similarly implemented individually.

When it is desired to update schedule information, mail information, document information and workflow information stored in the respective databases connected to the associated servers of the server apparatus, or when it is desired to modify some of schedule, document management and workflow operations according to the states of the clients of the client apparatus or to the states of the respective servers of the server apparatus; it has been necessary to define or update the information for the individual groupware functions update.

For example, when a user in one of the client apparatuses modified the schedule, it may be required to change the mail, document management and workflow operations. In such a case, in the prior art, a request of the schedule client of the client apparatus in question causes the schedule server of the server apparatus to register a new schedule in a schedule management database under its own control. Thereafter, since the new schedule changes the mail, document management and workflow operations, it has been required that, in response to a request of the mail client of the client apparatus in question, the mail server of the server apparatus update the mail management database under its own control; in response to a request of the document management client of the client apparatus in question, the document management server of the server apparatus update the document management database under its own control; and, in response to a request of the workflow client of the client apparatus in question, the workflow server of the server apparatus update the workflow management database under its own control, respectively.

In this way, when a generation of an event (such as modification of the schedule) causes modification of a series of operations, this troublesomely involves definition or information change for each of mechanisms (servers) supporting the respective operations, which is highly inconvenient from the operational view point.

SUMMARY OF THE INVENTION

It is therefore an object of the present invention to provide a groupware system for cooperatively executing a plurality of groupware functions, in which a user can previously set modification of a series of operations caused by an event or a combination of events generated by the respective groupware functions.

In accordance with an aspect of the present invention, the above object is attained by providing a groupware system including at least one server apparatus each having a plurality of clients of different groupware functions and at least one server apparatus having groupware function servers provided associated with the plurality of clients, the client apparatus being connected with the server apparatus through a network; the system comprising:

an agent client having an agent definition unit for receiving user's input to prepare agent definition information; and an agent server having an agent generation unit, a trigger monitor unit, a filtering unit and an action request processing unit, wherein the agent generation unit has means for receiving the agent definition information from the agent client, dividing the agent definition information into sub-information pieces, and distributing the sub-information pieces to the trigger monitor unit, filtering unit and action request processing unit, the trigger monitor unit has means for monitoring and detecting a trigger specified by the distributed agent definition information piece, the filtering unit has means for extracting from the detected trigger the trigger satisfying conditions specified by the distributed agent definition information piece, and the action request processing unit has means for requesting the specified groupware function server to perform an action specified by the distributed agent definition information piece and associated with the extracted trigger.

In the present invention, each of the groupware function servers other than the agent server may include an individual function agent having a trigger monitor unit and a filtering unit, the trigger monitor unit of the individual function agent may have means for receiving the distributed agent definition information piece from the agent generation unit of the agent server, monitoring and detecting a trigger specified by the agent definition information piece, the filtering unit of the individual function agent may have means for receiving the distributed agent definition information piece from the agent generation unit of the agent server and extracting from the detected trigger a trigger satisfying conditions specified by the agent definition information piece, and the individual function agent may send the extracted trigger to the action request processing unit of the agent server.

In the present invention, further, the agent server further may have a report processing unit, the agent client further may have a report unit, the report processing unit may have means for receiving the distributed agent definition information piece from the agent generation unit of the agent server and, when receiving action result information from the groupware function server which received the action request from the agent server, preparing a report on the basis of the agent definition information piece, and sending the report to the agent client, and the report unit may have means, when receiving the report, for outputting the report in the client apparatus.

In the present invention, furthermore, the agent definition unit and the units other than the agent generation unit may have respectively memory means for storing therein the respective distributed agent definition information pieces.

In accordance with an embodiment of the present invention, since a user conducts an agent definition with use of the agent client in the client apparatus, when an event associated with the agent definition takes place in the groupware system, desired operations to be carried out in response to the generation of the event can be automatically executed according to contents of the agent definition in the groupware system. As a result, the need for such works that have been conducted by the user when the event takes place to execute desired operations in the prior art can be eliminated, the burden imposed on the user in the groupware system can be remarkably lightened, and the operations of the groupware system can be automatically carried out.

BRIEF DESCRIPTION OF THE DRAWINGS

FIG. 13 is a second specific example of the operations of the groupware system of FIG. 1;

FIG. 14 is a third specific example of the operations of the groupware system of FIG. 1;

FIG. 15 shows an exemplary list of trigger, filter and action;

FIG. 16 is an example of agent definition information in the specific example 1 of FIG. 12;

FIG. 17 is an example of agent definition information of the specific example 2 of FIG. 13; and FIG. 18 is an example of agent definition information of the specific example 3 of FIG. 14.

DESCRIPTION OF THE PREFERRED EMBODIMENTS

Figure 1:
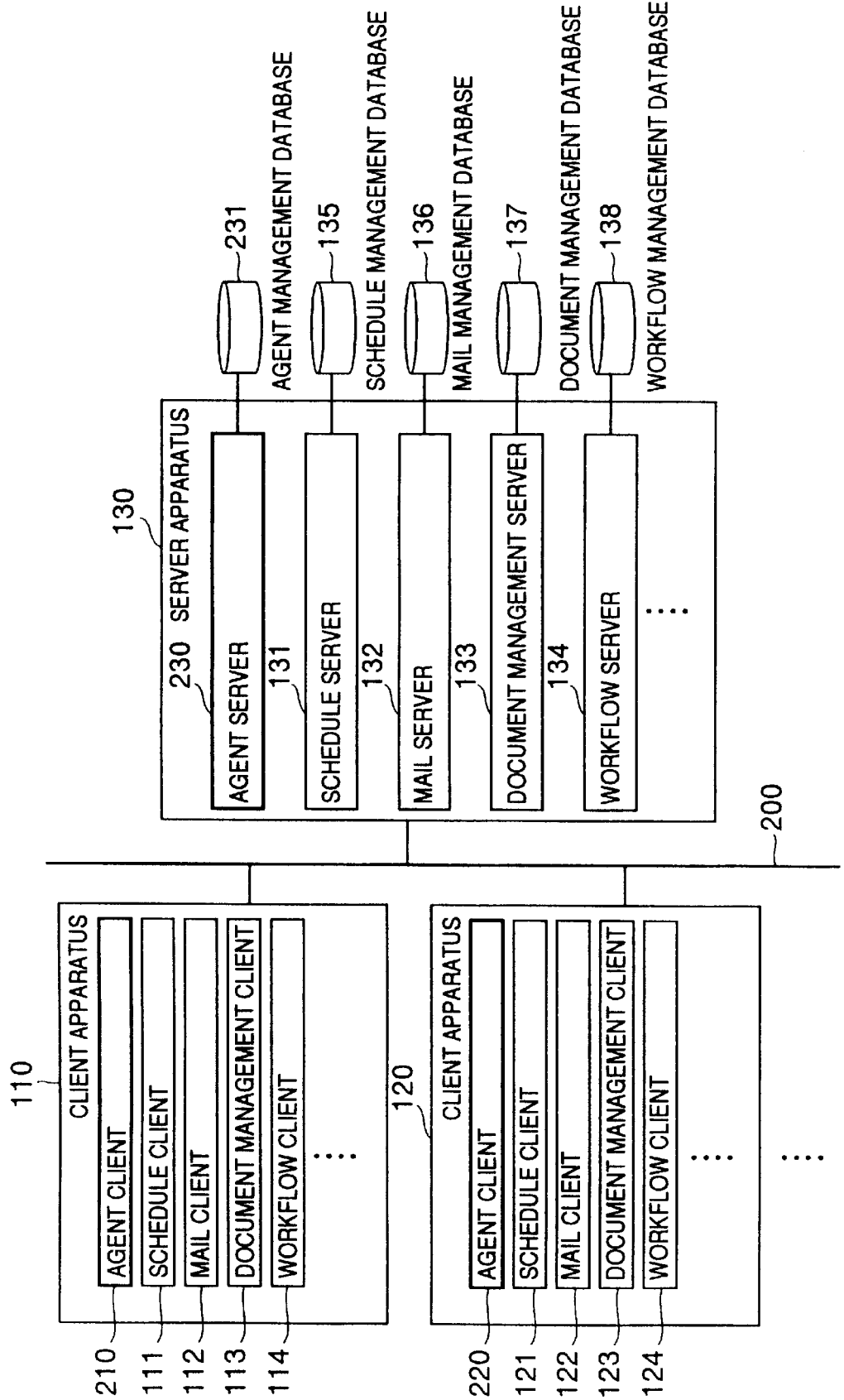
FIG. 1 schematically shows an arrangement of a groupware system in accordance with an embodiment of the present invention.

FIG. 1 shows a schematic arrangement of an embodiment of a groupware system in accordance with the present invention.

In FIG. 1, for the purpose of realizing a schedule function on a network 200, a schedule unit 130 includes a schedule server 131, which in turn is connected with a schedule management database 135 to be managed by the schedule server, and client apparatuses 110 and 120 include schedule clients 111 and 121 respectively.

For the purpose of realizing a mail function, the schedule unit 130 includes a mail server 132, which in turn is connected with a mail management database 136 to be managed by the mail server, and the client apparatuses 110 and 120 include mail clients 112 and 122 respectively.

For the purpose of realizing a document management function, the schedule unit 130 includes a document management server 133, which in turn is connected with a document management database 137 to be managed by the document management server, and the client apparatuses 110 and 120 include document management clients 113 and 123 respectively.

For the purpose of realizing a workflow function, the schedule unit 130 includes a workflow server 134, which in turn is connected with a workflow management database 138 to be managed by the workflow server, and the client apparatuses 110 and 120 include workflow clients 114 and 124 respectively.

In addition to the above clients, the client apparatuses 110 and 120 include agent clients 210 and 220 by which respective users define their agents or provide their port outputs in response to a request from the user, respectively. The schedule unit 130 also includes an agent server 230 for executing the defined agents. Connected to the agent server 230 is an agent management database 231 to be managed by the agent server. In this connection, the word "agent" as used herein means agency or proxy operations, that is, when an event takes place, operations to be involved by the generation of the event are substituted, including works to be done by a user.

Interconnection among the schedule unit 130 and client apparatuses 110 and 120 is carried out by means of the network 200.

Figure 2:
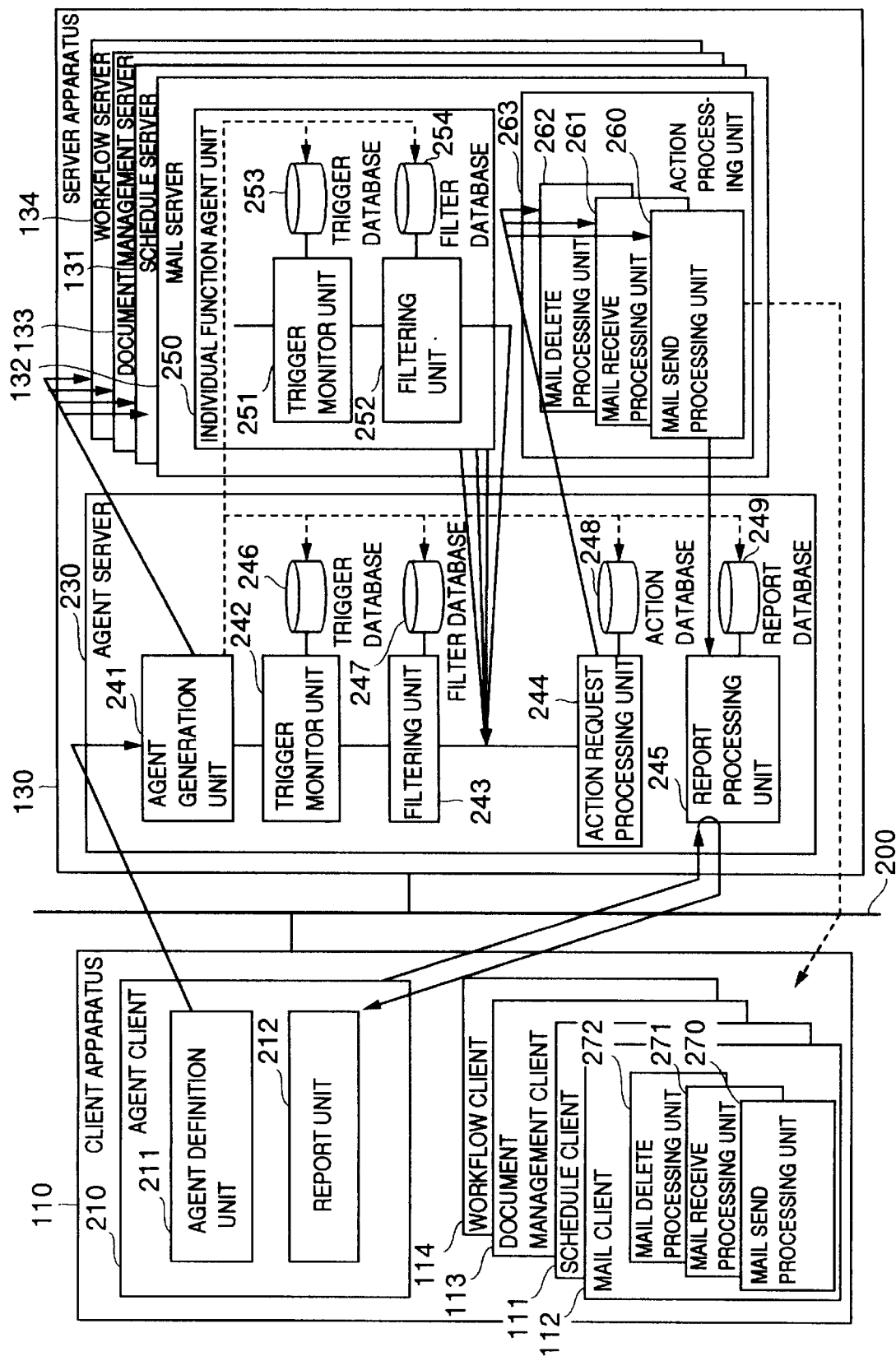
FIG. 2 shows details of an example of the arrangement of the groupware system of FIG. 1.

Shown in FIG. 2 is a more detailed arrangement of the present embodiment.

In the client apparatus 110, the agent client 210 has an agent definition unit 211 and a report unit 212.

In the server apparatus 130, the agent server 230 has an agent generation unit 241, a trigger monitor unit 242, a trigger database 246 connected to the trigger monitor unit, a filtering unit 243, a filter database 247 connected to the filtering unit, an action request processing unit 244, an action database 248 connected to the action request processing unit, a report processing unit 245, and a report database 249 connected to the report processing unit.

In this connection, the word "trigger monitor" as used herein means to monitor generation of an event, whereas, the word "filtering" as used herein means to check trigger conditions detected by the trigger monitor and to extract the trigger conforming to the conditions.

Each of the mail server 132, schedule server 131, document management server 133 and workflow server 134 includes an individual function agent unit 250 and an action processing unit 263. The function agent unit 250 has a trigger monitor unit 251, a trigger database 253 connected to the trigger monitor unit, a filtering unit 252, and a filter database 254 connected to the filtering unit.

FIG. 2 shows a detailed structure of the mail server 132, in which case the action processing unit 263 has a mail send processing unit 260, a mail receive processing unit 261, and a mail delete processing unit 262.

The schedule server 131, document management server 133 and workflow server 134 also has a group of action processing units corresponding to the respective functions.

In the client apparatus 110, the mail client 112, schedule client 111, document management client 113, and workflow client 114 have respective units for processing the respective functions. FIG. 2 shows an example of mail client, having a mail send processing unit 270, a mail receive processing unit 271 and a mail delete processing unit 272.

Explanation will next be made as to the operation of the present embodiment.

In the client apparatus 110 in FIG. 2, first of all, the user interactively enters or selects a desired item while looking at a display screen. The agent definition unit 211, on the basis of the user's input, prepares agent definition information and transmits the prepared information to the agent generation unit 241 of the agent server 230 through the network 200. The agent definition information includes trigger information, filtering information, action request information, and report processing information. Specific examples of the agent definition information are shown in FIGS. 16, 17 and 18.

The agent generation unit 241 divides the received agent definition information into the trigger, filtering, action request and report processing information. The divided information pieces are stored respectively in the trigger database 246, filter database 247, action database 248 and report database 249, which form part of the agent management database 231 of the agent server 230; and also in the trigger database 253 and filter database 254 of the individual function agent units 250 of the groupware function server associated with the agent definition information (e.g., mail server 132).

And the trigger monitor units 242, 251 and report processing unit 245, which form part of the agent server 230, are activated.

Under this condition, when a trigger is generated under the monitoring of the trigger monitor unit 242 on the basis of information within the trigger database 246 in such an individual server as the agent server 230 or the mail server 132, or when a trigger is generated under the monitoring of the trigger monitor unit 251 on the basis of information within the trigger database 253; the filtering unit 243 performs its filtering operation on the basis of information within the filter database 247 or the filtering unit 252 performs its filtering operation on the basis of information within the filter database 254, to thereby judge whether to conform to action starting conditions. When the action starting conditions are judged to be satisfied, the action request processing unit 244, on the basis of the information of the action processing database, issues an action processing request to the associated groupware function server such as the mail server 132. In this conjunction, the action request processing unit 244 may issue the action processing request on the basis of logic of combination of action instructions of a plurality of groupware function servers.

The individual action processing units such as the mail server perform their action processing operations according to the aforementioned action processing request. In the case of the mail server 132, in response to the action processing request, the mail send processing unit 260, mail receive processing unit 261 and/or mail delete processing unit 262 executes the action, whereby the mail processing or modification desired by the user can be realized.

Thereafter, according to the contents of the report database 249, the report processing unit 245 prepares a report on the execution of the action processing and, in response to a report request from the user, issues the report to the user via the report unit 212 of the client.

Figure 3:
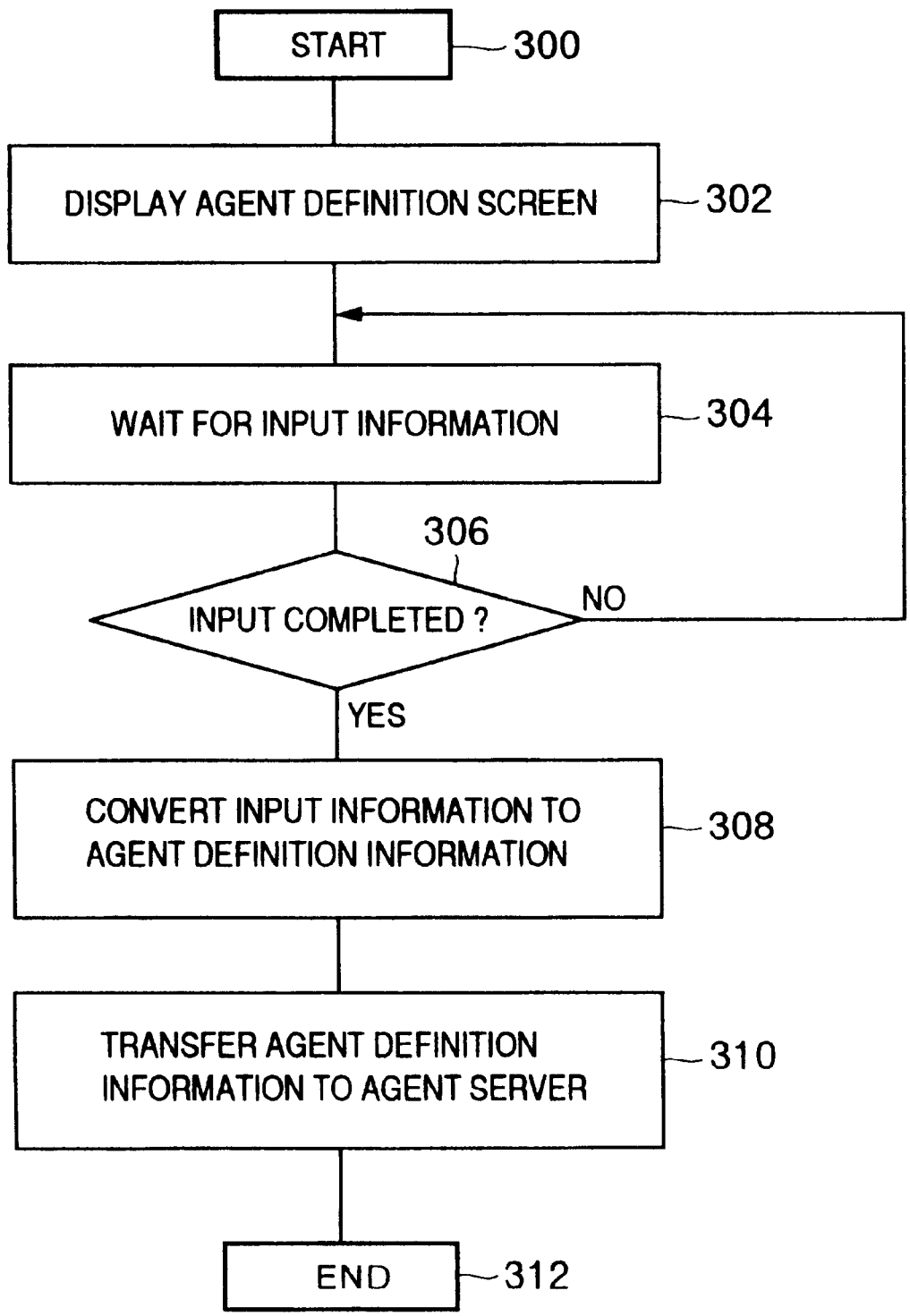
FIG. 3 is an exemplary flowchart of an agent definition process.

FIG. 3 shows an exemplary flowchart of an agent definition process in the agent definition unit 211.

In the drawing, the process starts with a step 300 and at a step 302, an agent definition display screen is displayed to the user.

Figure 4:
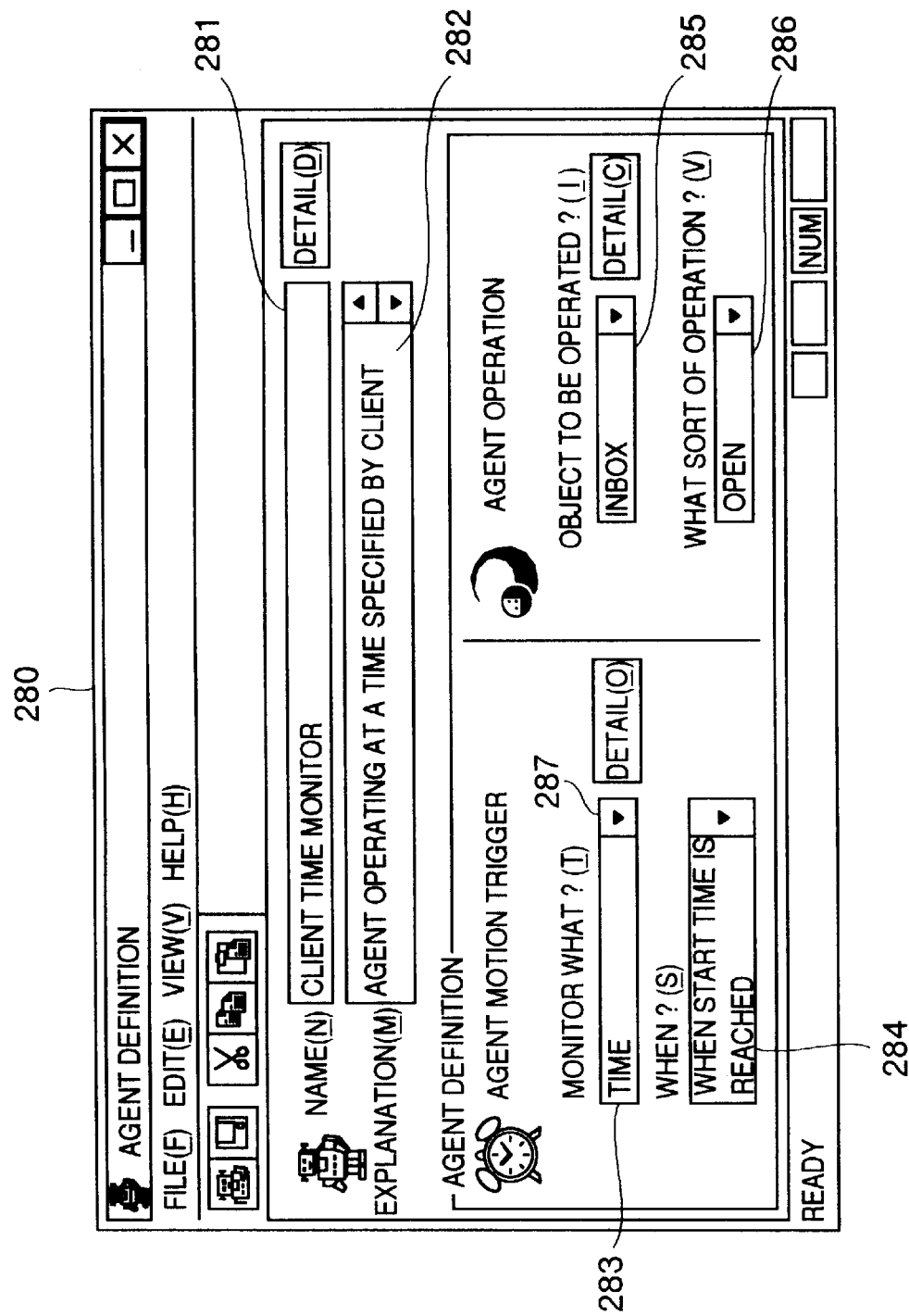
FIG. 4 shows an example of display screen when a user conducts the agent definition process.

The agent definition unit 211, at a step 304, waits for user's input information from a keyboard and/or a mouse. At the step 304, the operation is repeated until the input is judged to have entered at a step 306. An example of an agent definition screen is given in FIG. 4. The user, while looking at an agent definition screen 280, enters information necessary for user input fields 281 to 286 or selects desired information from a menu pulled down by clicking the mouse button on such an arrow button as 287.

When the user's input is judged at the step 306 as completed, the agent client translates at a step 308 the input information to agent definition information, transmits at a step 310 the agent definition information to the agent server 230, thus completing the operations at a step 312.

Each agent definition information has agent definition identification information applied by the agent client for distinguishing its own agent definition information from the other agent definition information.

For example, in the case of the agent definition information of the specific example 1 of FIG. 16, in the first line:

0010 :id #"0001"'\n' the agent definition identification information is [0001].
In the specific example 2 of FIG. 17, in the first line:

0011 :id #"0002"'\n' the agent definition identification information is [0002].

Figure 5:
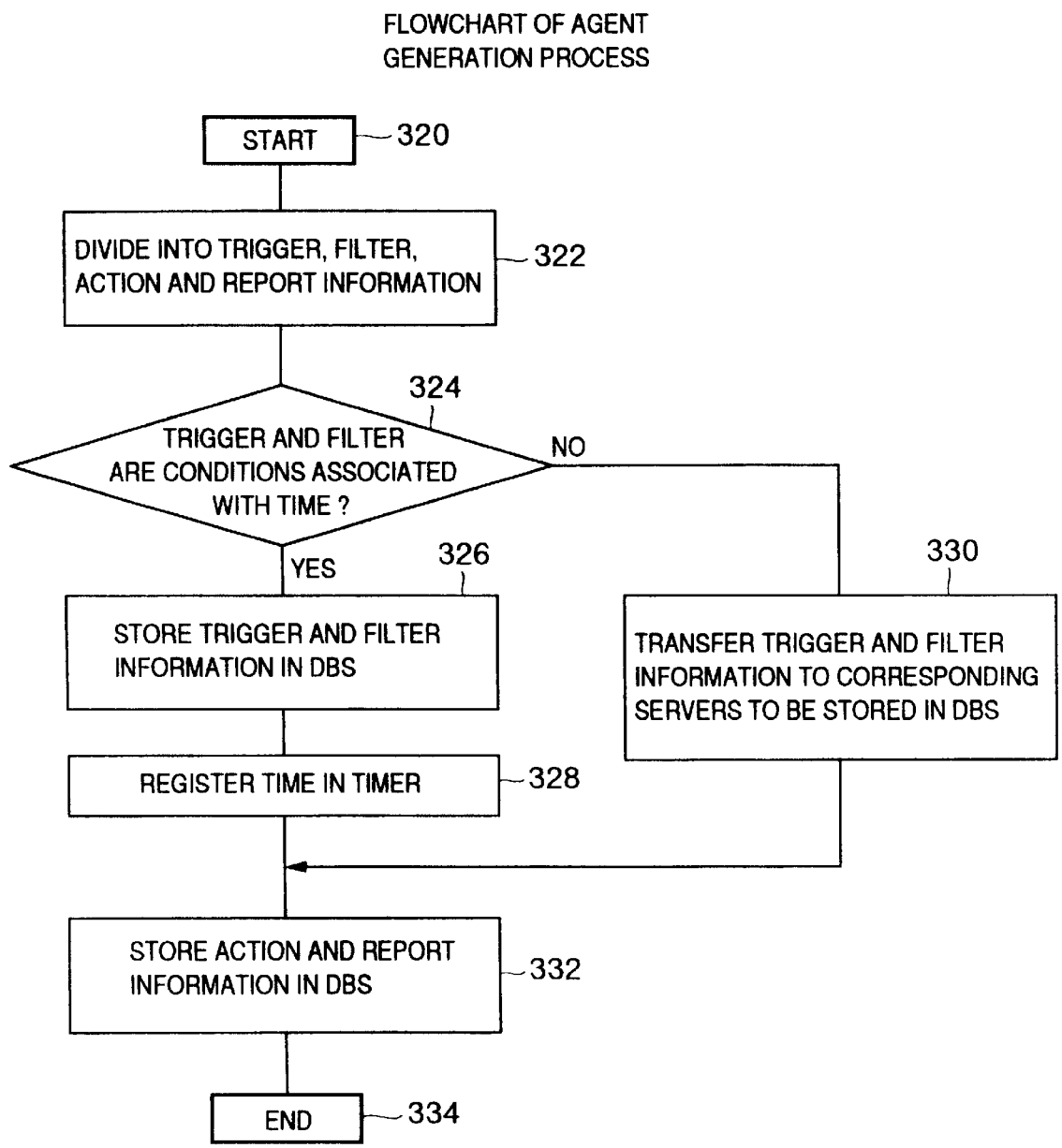
FIG. 5 shows an exemplary flowchart of an agent generation process.

Shown in FIG. 5 is an exemplary flowchart of an agent generation process to be carried out by the agent generation unit 241 of the server apparatus 130.

In this example, the agent generation unit starts its operation with a step 320 and, at a step 322, the agent generation unit divides, on the basis of information items, the agent definition information received from the agent definition unit 211 of the client apparatus 110 through the network 200, into trigger, filter, action and report information pieces.

When determining at a step 324 that the trigger and filter information are conditions associated with time point or time duration, the agent generation unit proceeds to a step 326. At the step 326, the agent generation unit stores the trigger information in the trigger database 246 of the agent server 230 and also stores the filter information in the filter database 247 of the agent server 230. At a step 328, the agent generation unit further registers the trigger time in a timer within the agent server 230.

When determining at the step 324 that the trigger and filter information are not conditions associated with time point or time duration, on the other hand, the agent generation unit proceeds to a step 330. At the step 330, the agent generation unit stores the trigger information in the trigger database 253 of the function agent unit 250 and also stores the filter information in the filter database 254 of the function agent unit 250. That is, the trigger associated with time common to the groupware function servers is monitored by the agent server 230, and the trigger associated with other than the time is monitored by the groupware server.

At a next step 332, the agent generation unit stores the action information in the action database 248 and the report information in the report database 249, and at a step 334, the agent generation unit terminates its operation.

Figure 6:
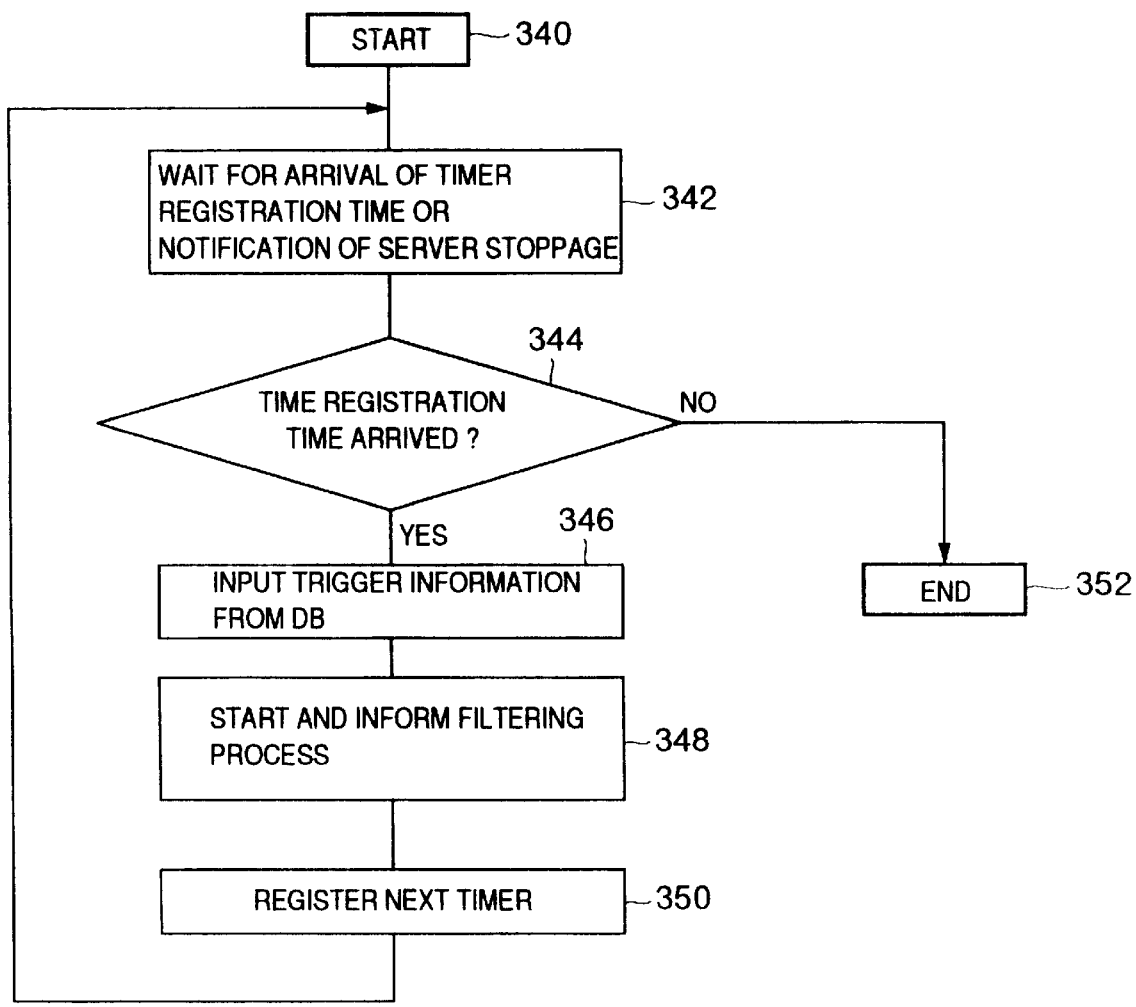
FIG. 6 is an exemplary flowchart of a trigger monitor process in an agent server.

FIG. 6 is an exemplary flowchart of a trigger monitor process within the agent server of the trigger monitor unit 242 of the agent server 230.

In this example, the trigger monitor unit starts its operation with a step 340 in an agent generation mode and, at a step 342, waits for a message indicative of arrival of a timer registration time or stoppage of the server.

When receiving a server stoppage message at a step 344, the trigger monitor unit proceeds to a step 352 and terminates its operation.

When receiving at the step 344 a message indicative of arrival of the time registered in the timer, the trigger monitor unit proceeds to a step 346. The trigger monitor unit receives at the step 346 the trigger information from the trigger database 246, activates the filtering unit 243 and informs the filtering unit 243 of the identification information and trigger (time in this case) of the agent definition information associated with the generated trigger at a step 348.

Thereafter, the trigger monitor unit registers at a step 350 the next time in the timer and returns to the step 342.

Figure 7:
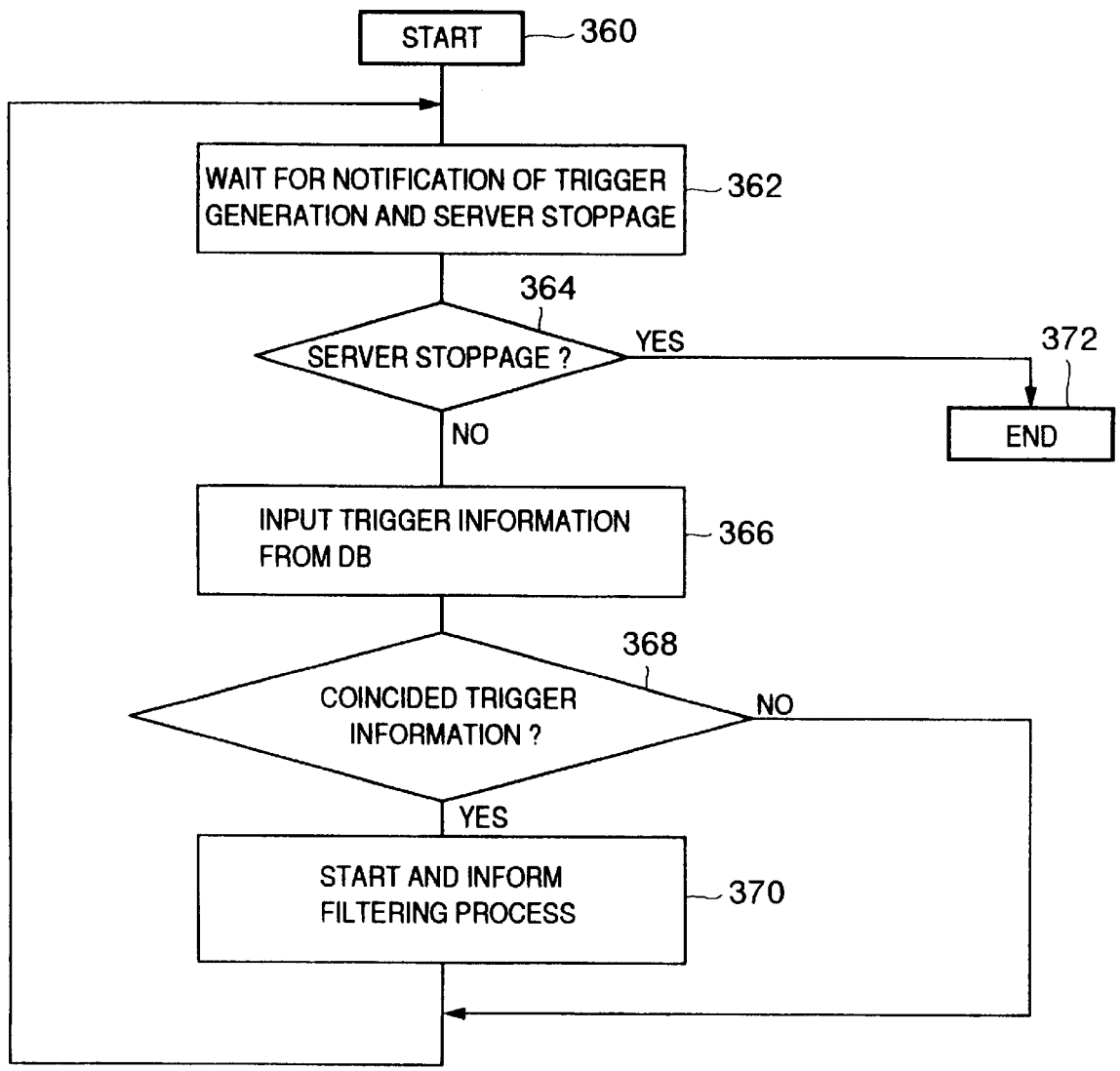
FIG. 7 is an exemplary flowchart of a trigger monitor process in a function server.

Referring to FIG. 7, there is shown an exemplary flowchart of a trigger monitor process of the trigger monitor unit 251 in the groupware function server.

In this example, the trigger monitor unit starts its operation with a step 360 in the agent generation mode and, at a step 362, waits for a message indicative of trigger generation or server stoppage.

When receiving a server stoppage message at a step 364, the trigger monitor unit proceeds to a step 372 and terminates its operation.

When receiving a trigger generation message at the step 364, the trigger monitor unit proceeds to a step 366 and receives the trigger information from the trigger database 253. When finding at a step 368 a coincidence between the trigger information, the trigger monitor unit activates the filtering unit 252 at a step 370 to inform the filtering unit 252 of the identification information and trigger of the agent definition information associated with the generated trigger, and then returns to the step 362. When failing to find the coincidence, the trigger monitor unit does not execute the operation of the step 370 and returns to the step 362.

Figure 8:
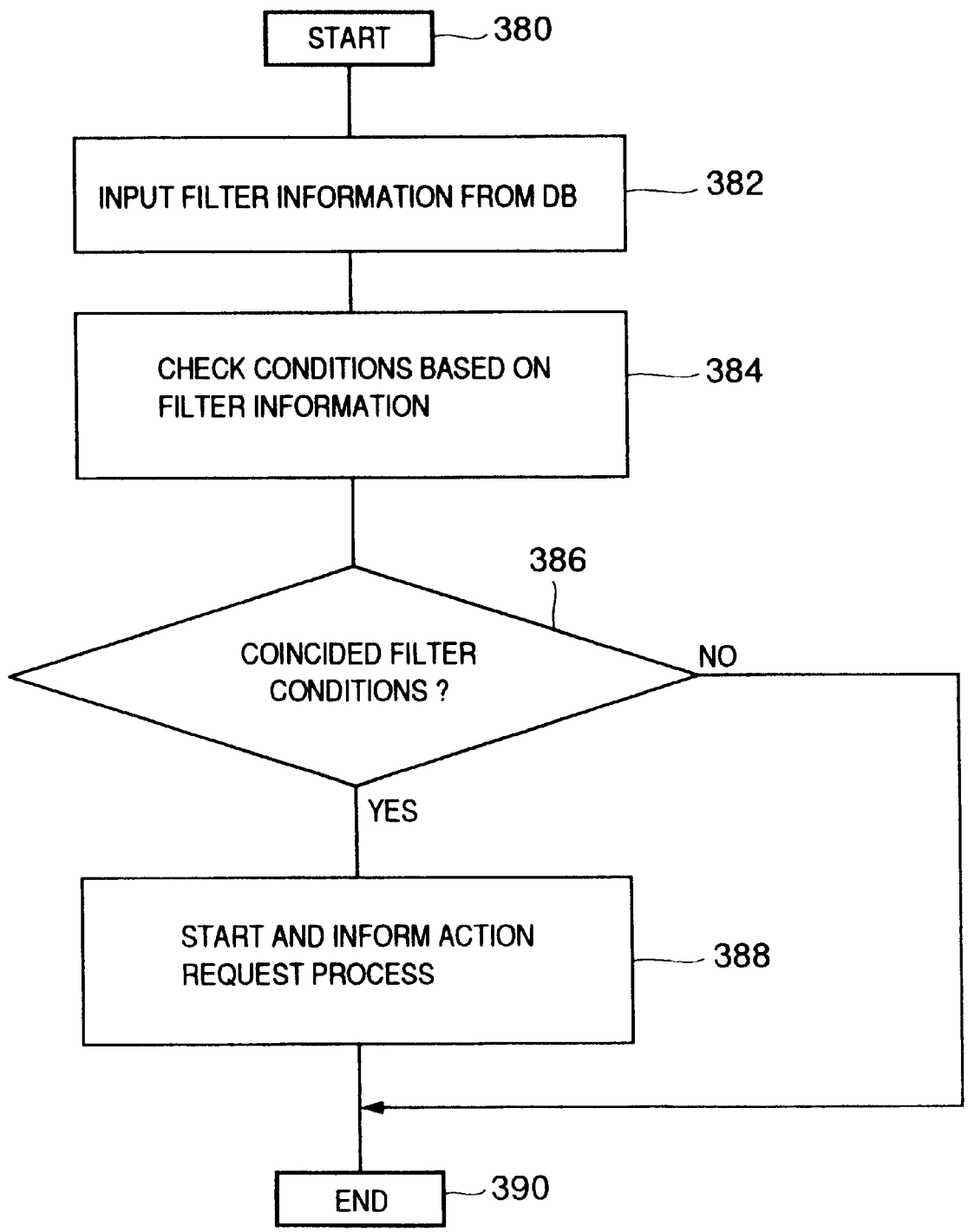
FIG. 8 is an exemplary flowchart of a filtering process.

Shown in FIG. 8 is an exemplary flowchart of a filtering process of the filtering unit 243 or 252.

The filtering unit starts its operation with the step 348 in FIG. 6, the step 370 in FIG. 7, or the step 380 in FIG. 8.

When activated at a step 382 from the step 348, the filtering unit receives the filter information from the filter database 247 or when activated from the step 370, the filtering unit receives the filter information from the filter database 254; and then checks the filter conditions at a step 384. That is, the filtering unit extracts the filter information of the identification information of the agent definition information informed by the trigger monitor unit, compares the filter information with trigger informed by the trigger monitor unit for check.

When finding a condition coincidence at a step 386, the filtering unit proceeds to a step 388 to activate the action request processing unit 244 and to inform the action request processing unit 244 of the identification information of the agent definition information of the condition coincidence; and then terminates its operation at a step 390.

When failing to find the condition coincidence, the filtering unit proceeds to a step 390 and terminates its operation.

That is, when finding the filter condition coincidence, the filtering unit activates an action request process.

Figure 9:
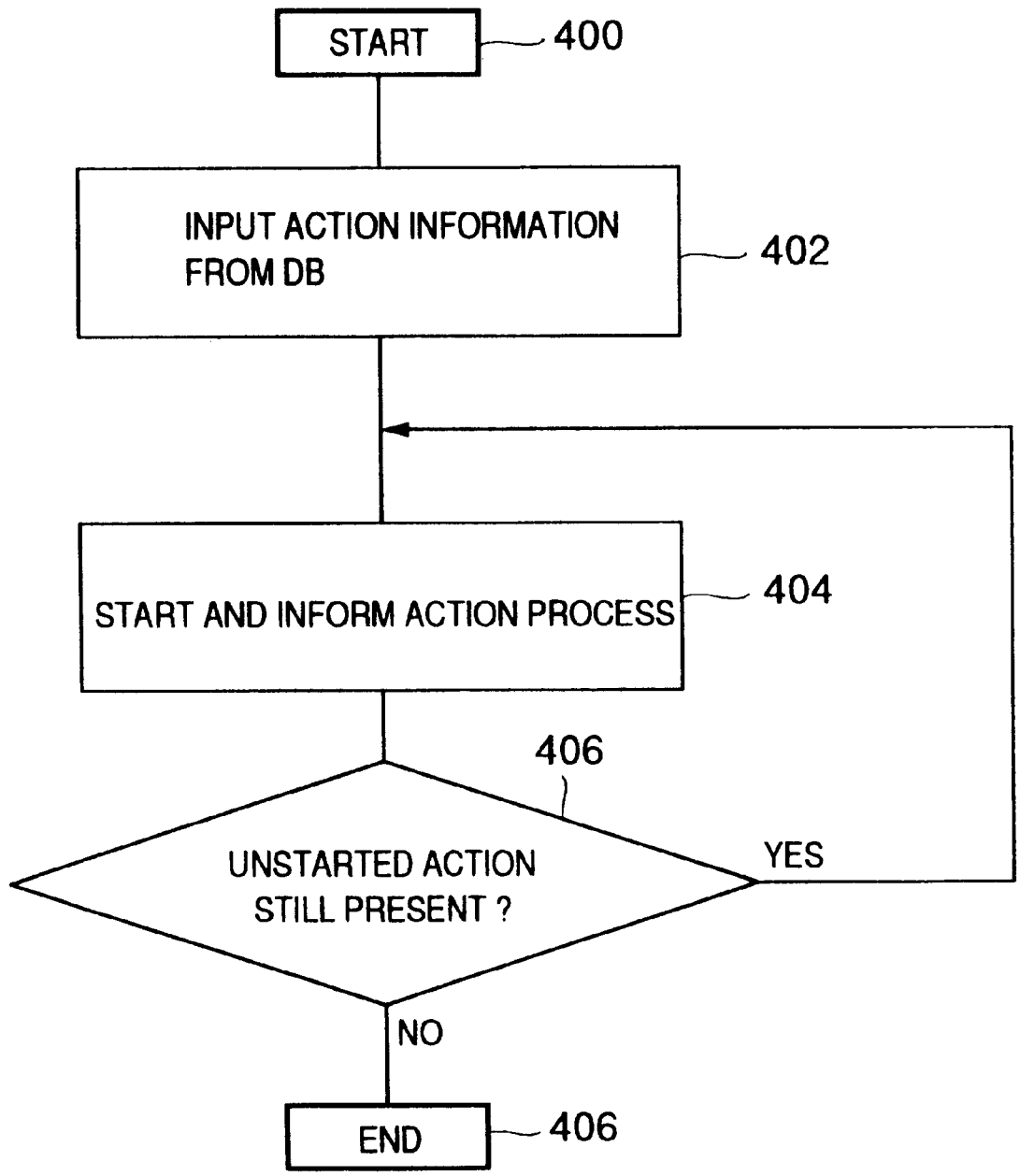
FIG. 9 is an exemplary flowchart of an action request process.

FIG. 9 shows an exemplary flowchart of an action request process of the action request processing unit 244.

In this example, the action request processing unit 244 activated at the step 388 in FIG. 8 starts its operation with a step 400.

The action request processing unit receives, at a step 402 from the action database 248, action information corresponding to the identification information of the agent definition information informed from the filtering unit.

At a step 404, the action request processing unit, on the basis of the action information, activates the action processing process of the action processing unit, and reports it to the unit which activated the action information. When there is no action process not activated at a step 406, the action request processing unit proceeds to a step 408 and terminates its operation.

In the case of the mail server of FIG. 2, the action request processing unit, on the basis of the action information at the step 404, activates the action process of the mail send processing unit 260, mail receive processing unit 261 and/or mail delete processing unit 262 to inform the activated unit of the action information. When there is no action process not activated yet at the step 406, the action request processing unit goes to the step 408 and terminates its operation.

When there is an action process not activated, the action request processing unit returns to the step 404.

As a result, all the action operations instructed by the action information can be executed.

Figure 10:
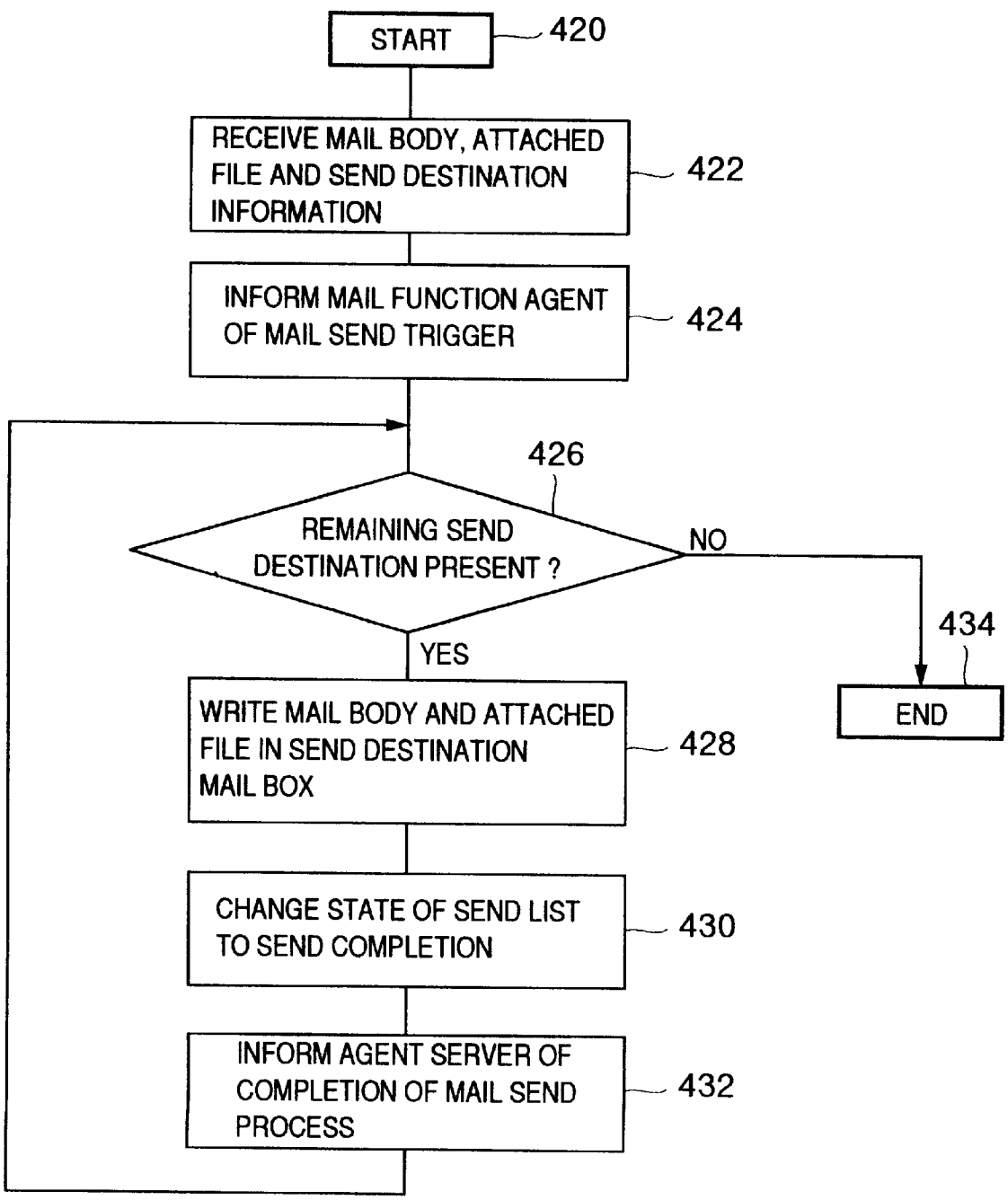
FIG. 10 is an exemplary flowchart of a mail send process.

FIG. 10 shows an exemplary flowchart of a mail send process to be carried out by the mail send processing unit 260 of the mail server 132, as an example of the action process.

When receiving mail body, attached file and send destination information, the mail send processing unit starts its operation with a step 420.

At a step 422, the mail send processing unit receives the mail body, attached file and send destination information from the action request processing unit 244, and proceeds to a step 424. At the step 424, the mail send processing unit informs the function agent unit 250 or mail function agent of the mail server 132, of a mail send trigger.

This results in generation of a trigger at the step 362.

When there is no remaining send destination at a step 426, the mail send processing unit proceeds to a step 434, and terminates its operation.

When there is a remaining send destination, the mail send processing unit goes to a step 428. At the step 428, the mail send processing unit the mail body and attached file in a mail box of the send destination. The mail send processing unit then changes the state of a send list to a finished send state at a step 430, informs the agent server 230 of completion of the mail send process at a step 432, and returns to the step 426.

Figure 11:
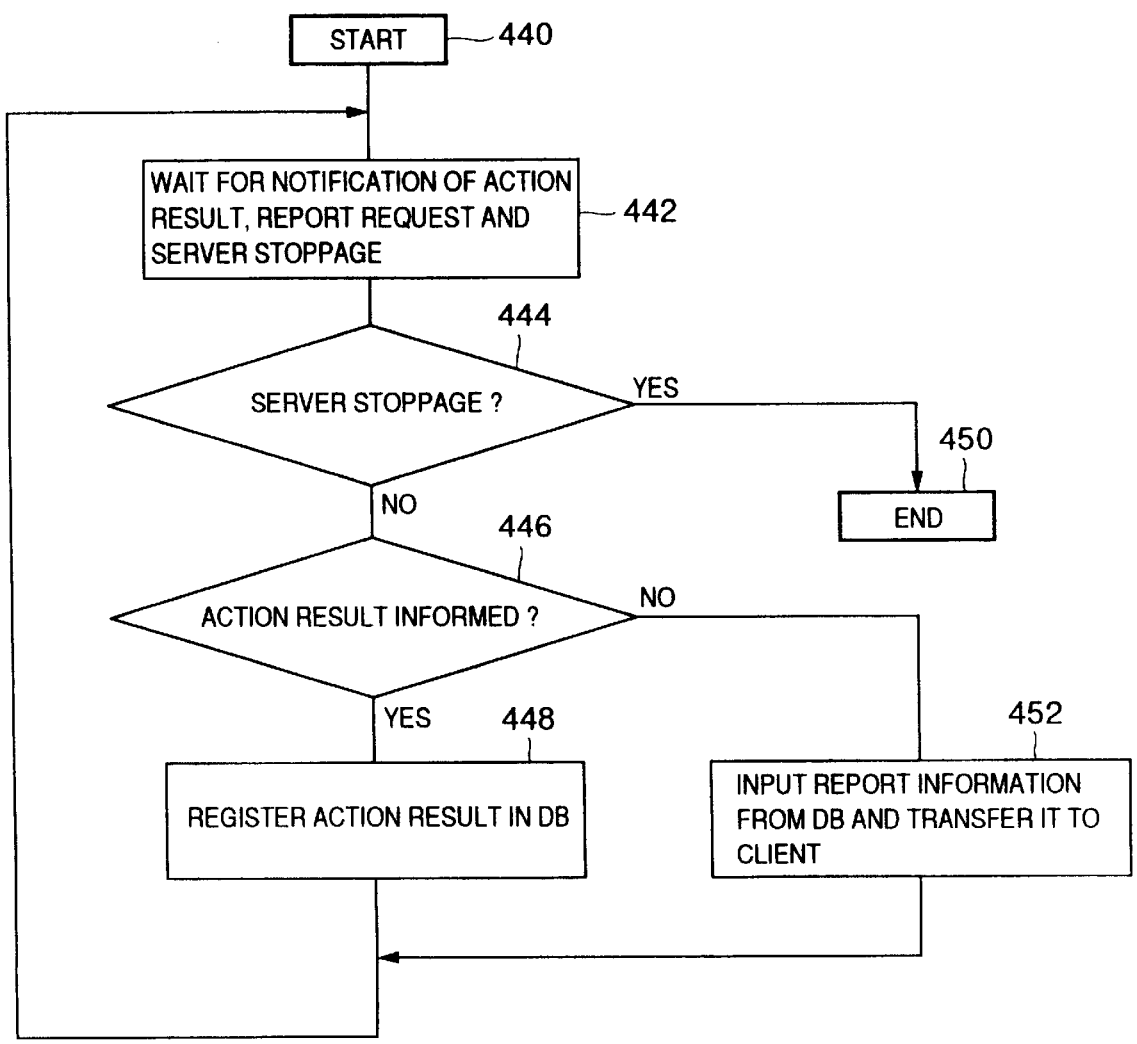
FIG. 11 is an exemplary flowchart of a report process.

An exemplary flowchart of a report process of the report processing unit 245 is shown in FIG. 11.

In this example, the report processing unit starts its operation with a step 440 in the agent generation mode.

At a step 442, the report processing unit waits for a message indicative of action result, report request and server stoppage.

When determining the server stoppage at a step 444, the report processing unit proceeds to a step 450 and terminates its operation.

When determining at a step 446 reception of an action result message, the report processing unit proceeds to a step 448 to record the action result in the report database 249, and then returns to the step 442.

When determining a report request from the user, the report processing unit proceeds to a step 452 to receive the report information from the report database 249 and to transmit it to the report unit 212 of the agent client 210, and then returns to the step 442.

Referring to FIG. 15, there is shown an example of the trigger, filtering and action as well as agent definition scripts associated therewith.

In the filtering process, there may also be specified combinations of specific values of individual trigger and filtering items, ranges of upper and lower limit values, and logical "AND" and "OR" operations.

Explanation will be made as to the specific operational example 1 in connection with FIGS. 12 and 16.

The present specific example implements "to automatically delete already-opened mails in a server at 23:00 every Friday" with respect to a specific user.

Figure 12:
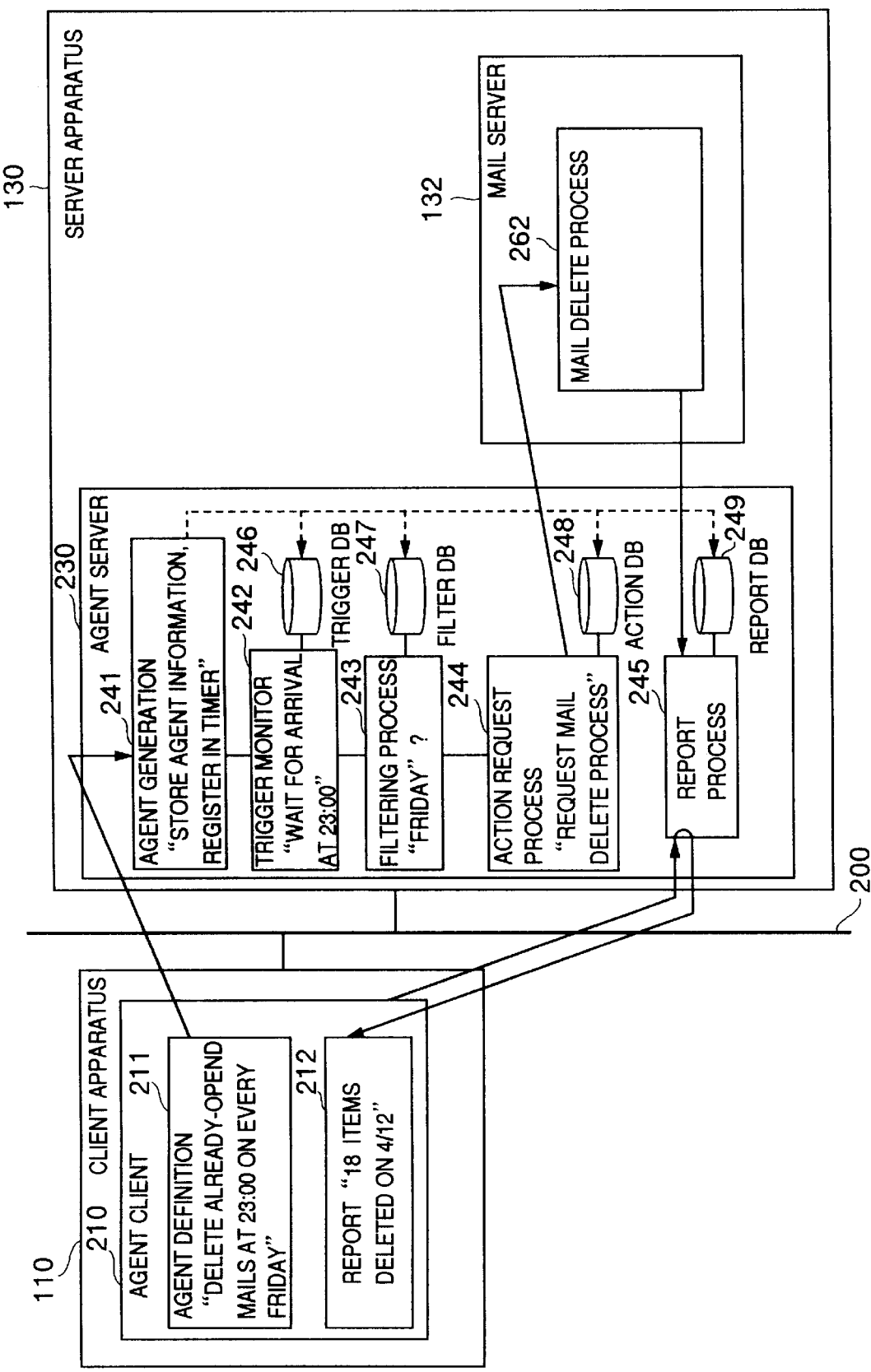
FIG. 12 is a first specific example of operations of the groupware system of FIG. 1.

In FIG. 12, the user enters necessary inputs with use of the agent definition unit 211 of the agent client 210. This causes the agent definition unit 210 to generate such agent definition information as shown in FIG. 16 on the basis of the inputs.

In the illustrated example, such definition is made as to make the trigger valid when the time is at 23:00 in the agent server 230 at lines "0060" and "0070" of FIG. 16.

Further, at line "0080", Friday is specified as the filter information.

Furthermore, at lines "0090" and "0100", deletion of already-opened mails is specified to the mail server.

The agent definition information is sent from the agent definition unit 211 to the agent generation unit 241.

Information from lines "0010" to "0040" as well as information of line "0070" are stored in the trigger database 246.

The information from lines "0010" to "0040" as well as information of line "0080" are stored in the filter database 247, while the information from lines "0010" to "0040" as well as information of lines "0090" and "0100" are stored in the action database 248.

The information of the lines "0010" to "0040" as well as information of line "0050" are stored in the report database 249.

Further, since trigger is associated with time, the trigger monitor process is carried out by the trigger monitor unit 242. The report process is activated by the report processing unit 245.

When the times becomes "23:00", on the basis of the information of the trigger database 246 and the trigger, the trigger monitor unit 242 activates the filtering unit 243 informs the filtering unit 243 of "0001" as the identification information of the agent definition information.

The filtering unit 243, on the basis of the information of the filter database 247 associated with the identification information "0001" and the trigger, judges that it is Friday, in which case the filtering unit 243 activates the action request processing unit 244 and informs the action request processing unit 244 of the identification information "0001".

The action request processing unit 244, on the basis of the information of the action database associated with the identification information "0001", requests the mail delete processing unit 262 of the mail server 132 to delete the mails.

After receiving a report indicative of completion of the mail deleting operation, if the agent server 230 receives a report request from the user, then the agent server 230 issues the report request to the report processing unit 245.

The report processing unit 245, on the basis of the information of the report database 249, displays such a message that, e.g., "18 mails were deleted on 4/12" for the user through the report unit 212.

Explanation will be made as to a specific operational example 2 in connection with FIGS. 13 and 17.

The specific operational example 2 implements that "when there is an additional document to a new library binder in the document management server, the mail server automatically informs the user of the document addition" for a user.

In FIG. 13, the user enters necessary inputs with use of the agent definition unit 211 of the agent client 210. This causes the agent definition unit 210 to, on the basis of the inputs, generate such agent definition information as shown in FIG. 17.

In the illustrated example, such a definition is made at lines "1060" and "1070" of FIG. 17 that the trigger becomes valid when a document is added in the document management server 133.

Further, a newly-received book is specified as the filter information at line "1080".

A mail send is specified to the mail server at lines "1090" and "1100".

The agent definition information is sent from the agent definition unit 211 to the agent generation unit 241.

Information of lines "1010" to "1040" as well as information of line "1070" are stored in the trigger database 513.

The information of lines "1010" to "1040" as well as information of line "1080" are stored in the filter database 514.

The information of lines "1010" to "1040" as well as information of lines "1090" and "1100" are stored in the action database 248.

The information of lines "1010" to "1040" as well as information of line "1050" are stored in the report database 249.

Further, since the trigger is not associated with time, the trigger monitor unit 511 performs its trigger monitor process. The report processing unit 245 activates its report process.

When a document is added, the trigger monitor unit 511, on the basis of the information of the trigger database 513 and the trigger, activates the filtering unit 512 and informs the filtering unit 512 of "0002" as the identification information of the agent definition information and the trigger.

On the basis of the information of the filter database 514 associated with the identification information "0002" and the trigger, the filtering unit 512 judges whether or not there is a document addition to a newly-received book library and, in the case of a newly-received book, the filtering unit 512 activates the action request processing unit 244 and informs the action request processing unit 244 of the identification information "0002".

The action request processing unit 244, on the basis of the information of the action database 248 associated with the identification information "0002", requests the mail send processing unit 260 of the mail server 132 to perform its mail send operation.

The mail send processing unit 260, transmits to the user a message saying, e.g., that "a document (library introduction (3)) was added" through the mail receive processing unit 271 of the associated mail client 112.

After the agent server 230 receives a report indicative of completion of the mail send operation, if there is a report request from the user, the agent server 230 issues the report request to the report processing unit 245.

The report processing unit 245, on the basis of the information of the report database 249, displays for the user a message, e.g., saying that "the mail was sent on 4/8" through the report unit 212.

Explanation will next be made as to a specific operational example 3 in connection with FIGS. 14 and 18.

The specific example 3 implements that "at the time when a business trip schedule for more than one week was registered in the schedule server, the workflow is automatically transferred to the alternate and the mail server sends a mail to the alternate to substitute the operation in the workflow server" for a user.

In FIG. 14, the user enters necessary inputs with use of the agent definition unit 211 of the agent client 210. On the basis of the inputs, the agent definition unit 210 generates such agent definition information as shown in FIG. 18.

In the illustrated example, such definition is made at lines "2060" and "2070" of FIG. 18 that the trigger becomes valid when the user adds the schedule in the schedule server 131.

Further, that the user's additional schedule means a business trip for more than one week is specified as the filter information at lines "2080" and "2090".

Furthermore, alternate operation is specified at lines "2100" and "2110" to the workflow server 134 and alternate operation is specified at lines "2120" and "2130" to the mail server 132.

The agent definition information is sent from the agent definition unit 211 to the agent generation unit 241.

Information of lines "2010" to "2040" as well as information of lines "2060" and "2070" are stored in the trigger database 563.

The information of lines "2010" to "2040" as well as information of lines "2080" and "2090" are stored in the filter database 564.

The information of lines "2010" to "2040" as well as information of lines "2100", ""2110, "2120" and "2130" are stored in the action database 248.

The information of lines "2010" to "2040" as well as information of line "2050" are stored in the report database 249.

Since the trigger is not associated with time, the trigger monitor unit 561 performs its trigger monitoring operation. Further, the report processing unit 245 activates the report process.

When the schedule was registered, the trigger monitor unit 561, on the basis of the information of the trigger database 563 and the trigger, activates the filtering unit 562 and informs the filtering unit 562 of both "0003" as the identification information of the agent definition information and the trigger.

On the basis of the information of the filter database 564 associated with the identification information "0003" and the trigger, the filtering unit 562 judges whether to be the business trip for more than one week and, in the case of the business trip for more than one week, the filtering unit 562 activates the action request processing unit 244 and informs the action request processing unit 244 of the identification information "0003".

On the basis of the information of the action database 248 associated with the identification information "0003", the action request processing unit 244 requests a work alternate processing unit 600 of the workflow server 134 to change the state of a work tray to "during substitution". After the work tray state is changed, the work alternate processing unit 600 informs the agent server 230 of end of the operation.

On the basis of the information of the action database 248 associated with the identification information "0003", the action request processing unit 244 requests the mail alternate processing unit 610 of the mail server 132 to change the state of a mail box to "during substitution".

After the mail server state is changed, the mail alternate processing unit 610 informs the agent server 230 of end of the operation.

The alternate-specified work is sent to a work reception unit 620 of the workflow client 124 and the alternate-specified mail is sent to the mail receive processing unit 271 of the mail client 122, so that the alternate using the client apparatus 120 processes the work and mail.

After the agent server 230 receives the report of the operation completion, when the agent server receives a request from the user, the agent server 230 issues a report request to the report processing unit 245.

On the basis of the information of the report database 249, the report processing unit 245 displays, e.g., messages "the workflow was alternate-set" and "the mail was alternate-set" through the report unit 212 for the user.

Although the plurality of groupware function servers have been included in the single server apparatus in the groupware system of the foregoing embodiment, a plurality of groupware function servers may be connected in the network each as a single server apparatus in a groupware system, with substantially the same effects as the foregoing embodiment.

Further, the processing procedures shown by the flowcharts in the drawings may be stored in such a storage medium as, e.g., CD-ROM, DAT, RAM or ROM.

What is claimed is:

1. A groupware system including at least one client apparatus each having a plurality of clients of different groupware functions and at least one server apparatus having groupware function servers provided associated with said plurality of clients, said client apparatus being connected with said server apparatus through a network; said system comprising:

an agent client having an agent definition unit for receiving user's input to prepare agent definition information; and an agent server having an agent generation unit, a trigger monitor unit, a filtering unit and an action request processing unit, wherein said agent generation unit has means for receiving the agent definition information from said agent client, dividing the agent definition information into sub-information pieces, and distributing the sub-information pieces to said trigger monitor unit, filtering unit and action request processing unit, said trigger monitor unit has means for monitoring and detecting a trigger specified by the distributed agent definition information piece, said filtering unit has means for extracting from the detected trigger the trigger satisfying conditions specified by the distributed agent definition information piece, and said action request processing unit has means for requesting the specified groupware function server to perform an action specified by the distributed agent definition information piece and associated with the extracted trigger.

2. A groupware system having an agent function as set forth in claim 1, wherein each of the groupware function servers other than said agent server includes an individual function agent having a trigger monitor unit and a filtering unit, the trigger monitor unit of said individual function agent has means for receiving the distributed agent definition information piece from the agent generation unit of said agent server, monitoring and detecting a trigger specified by the agent definition information piece, the filtering unit of said individual function agent has means for receiving the distributed agent definition information piece from the agent generation unit of said agent server and extracting from the detected trigger a trigger satisfying conditions specified by the agent definition information piece, and said individual function agent sends the extracted trigger to the action request processing unit of said agent server.

3. A groupware system having an agent function as set forth in claim 1, wherein said agent server further has a report processing unit, said agent client further has a report unit, said report processing unit has means for receiving the distributed agent definition information piece from the agent generation unit of said agent server and, when receiving action result information from the groupware function server which received the action request from said agent server, preparing a report on the basis of the agent definition information piece, and sending the report to said agent client, and said report unit has means, when receiving the report, for outputting the report in said client apparatus.

4. A groupware system having an agent function as set forth in claim 1, wherein said agent definition unit and said units other than the agent generation unit have respectively memory means for storing therein the respective distributed agent definition information pieces.

5. A groupware system having an agent function as set forth in claim 2, wherein said agent server further has a report processing unit, said agent client further has a report unit, said report processing unit has means for receiving the distributed agent definition information piece from the agent generation unit of said agent server and, when receiving action result information from the groupware function server which received the action request from said agent server, preparing a report on the basis of the agent definition information piece, and sending the report to said agent client, and said report unit has means, when receiving the report, for outputting the report in said client apparatus.

6. A groupware system having an agent function as set forth in claim 2, wherein said agent definition unit and said units other than the agent generation unit have respectively memory means for storing therein the respective distributed agent definition information pieces.

7. A groupware system having an agent function as set forth in claim 6, wherein said agent definition unit and said units other than the agent generation unit have respectively memory means for storing therein the respective distributed agent definition information pieces.

8. A groupware system as set forth in claim 1, wherein at least one of said groupware function servers and said agent server are commonly present in the single server apparatus connected in said network.

9. A groupware system as set forth in claim 1, wherein said groupware function servers and said agent server are provided respectively in individual server apparatuses connected in said network.

10. A groupware system as set forth in claim 1, wherein said groupware functions include at least two of a schedule function, a mail function, a document management function and a workflow function.

11. A method for executing an action desired by a user with use of at least one groupware function when user's desired conditions are satisfied in a groupware system including at least one client apparatus each having a plurality of clients of different groupware functions and at least one server apparatus having groupware function servers provided associated with said plurality of clients, said client apparatus being connected with said server apparatus through a network; comprising the steps of:

(a) on the basis of user's inputs received from the client apparatus, preparing agent definition information including trigger condition information for definition of said desired conditions and action information for definition of said desired action in the agent client of said client apparatus;

(b) sending said prepared agent definition information from said client apparatus through said network to the agent server connected to the network;

(c) in said agent server, dividing said received agent definition information into agent definition information pieces and distributing the agent definition information pieces to its own agent server and the associated groupware function servers;

(d) monitoring generation of an event in the servers on the basis of a trigger condition information piece of said distributed agent definition information pieces;

(e) detecting and transmitting a trigger detection from the server which detected the generation of an event satisfying conditions of said trigger condition information piece to said agent server;

(f) in response to said trigger detection, issuing an action request from said agent server through said network to the associated groupware function server; and (g) in response to said action request, executing an action based on an action information piece of said distributed agent definition information pieces in the associated groupware function server.

12. A method as set forth in claim 11, wherein said agent server, in said step (c), distributes the trigger condition information piece relating to time to its own agent server and distributes the other to the associated groupware function server.

13. A method as set forth in claim 11, wherein said agent server, in said step (f), issues the action request to the associated groupware function server on the basis of a logical operation result of the trigger detection from a plurality of servers.

14. A method as set forth in claim 11, wherein at least one of said groupware function servers and said agent server are commonly present in a single server apparatus connected to said network.

15. A method as set forth in claim 11, wherein said groupware function servers and said agent server are provided in each of individual server apparatuses connected to said network.

16. A method as set forth in claim 11, wherein said different groupware functions include at least two of a schedule function, a mail function, a document management function and a workflow function.

17. A storage medium readable by a computer for use in a groupware system including at least one client apparatus each having a plurality of clients of different groupware functions and at least one server apparatus having groupware function servers provided associated with said plurality of clients, said client apparatus being connected with said server apparatus through a network, said medium comprising:

(a) a first processing unit for causing an agent client of said client apparatus to prepare, on the basis of user's inputs received from the client apparatus, agent definition information including trigger condition information for definition of said desired conditions and action information for definition of said desired action;

(b) a second processing unit for causing said client apparatus to send said prepared agent definition information from said client apparatus through said network to the agent server connected to the network;

(c) a third processing unit for causing said agent server to drive said received agent definition information into agent definition information pieces and distributing the agent definition information pieces to its own agent server and the associated groupware function servers;

(d) a fourth processing unit for causing each of the servers to monitor generation of an event in the servers on the basis of a trigger condition information piece of said distributed agent definition information pieces;

(e) a fifth processing unit for causing the server which detected the generation of an event satisfying conditions of said trigger condition information piece, to transmit a trigger detection to said agent server;

(f) a sixth processing unit for causing said agent server in issue, in response to said trigger detection, an action request therefrom through said network to the associated groupware function server; and (g) a seventh processing unit for causing the associated groupware function server to execute, in response to said action request, an action based on an action information piece of said distributed agent definition information pieces.

18. A storage medium as set forth in claim 17, wherein at least said first and second processing units (a) and (b) are included in a storage medium unit to be mounted to said client apparatus, and at least said third and sixth processing units (c) and (f) are included in a storage medium unit to be mounted in the server apparatus having said agent server.

* * * * *